United States Patent
He et al.

(10) Patent No.: US 12,450,912 B2
(45) Date of Patent: Oct. 21, 2025

(54) METHOD, ELECTRONIC DEVICE, AND COMPUTER PROGRAM PRODUCT FOR ROAD MONITORING

(71) Applicant: Dell Products L.P., Round Rock, TX (US)

(72) Inventors: Bin He, Shanghai (CN); Wenlei Wu, Shanghai (CN); Jiacheng Ni, Shanghai (CN); Zhen Jia, Shanghai (CN)

(73) Assignee: Dell Products L.P., Round Rock, TX (US)

( * ) Notice: Subject to any disclaimer, the term of this patent is extended or adjusted under 35 U.S.C. 154(b) by 322 days.

(21) Appl. No.: 18/144,912

(22) Filed: May 9, 2023

(65) Prior Publication Data

US 2024/0346829 A1    Oct. 17, 2024

(30) Foreign Application Priority Data

Apr. 14, 2023    (CN) .......................... 202310402962.9

(51) Int. Cl.
  *G06V 20/54*     (2022.01)
  *G06V 10/74*     (2022.01)
  (Continued)

(52) U.S. Cl.
  CPC ............ *G06V 20/54* (2022.01); *G06V 10/761* (2022.01); *G06V 10/764* (2022.01);
  (Continued)

(58) Field of Classification Search
  CPC .. G06V 20/54; G06V 10/778; G06V 10/7715; G06V 10/761; G06V 10/764; G06V 2201/07; G08G 1/0104
  See application file for complete search history.

(56) References Cited

U.S. PATENT DOCUMENTS

| | | | |
|---|---|---|---|
| 11,282,380 B2 * | 3/2022 | Leblond | .................. G06T 17/05 |
| 2023/0004666 A1 * | 1/2023 | Beagle | ................. G06V 20/625 |
| 2023/0196908 A1 * | 6/2023 | Beaurepaire | ........... G06V 20/58 |
| | | | 701/117 |

OTHER PUBLICATIONS

A. Mogelmose et al., "Vision-Based Traffic Sign Detection and Analysis for Intelligent Driver Assistance Systems: Perspectives and Survey," IEEE Transactions on Intelligent Transportation Systems, vol. 13, No. 4, Dec. 2012, pp. 1484-1497.

(Continued)

*Primary Examiner* — David F Dunphy
(74) *Attorney, Agent, or Firm* — Ryan, Mason & Lewis, LLP

(57) ABSTRACT

Embodiments of the present disclosure provide a method, an electronic device, and a computer program product for monitoring. The method includes receiving, at a second node, a target image from a first node, where the target image is determined as being of a first category based on performing target detection on a road monitoring image obtained by the first node, and the second node is closer to a cloud end than the first node. The method further includes determining, at the second node, a second category of the target image, where the second category is a subcategory of the first category; and in response to the second category being a preset category, sending a warning corresponding to the second category to a terminal device associated with the road monitoring image. According to the method of the embodiments of the present disclosure, the accuracy of road monitoring warnings can be improved.

20 Claims, 10 Drawing Sheets

(51) Int. Cl.
*G06V 10/764* (2022.01)
*G06V 10/77* (2022.01)
*G06V 10/778* (2022.01)
*G08G 1/01* (2006.01)

(52) U.S. Cl.
CPC ........ *G06V 10/7715* (2022.01); *G06V 10/778* (2022.01); *G08G 1/0104* (2013.01); *G06V 2201/07* (2022.01)

(56) References Cited

OTHER PUBLICATIONS

Gtdlbench, "LISA Traffic Sign," https://git-disl.github.io/GTDLBench/datasets/lisa_traffic_sign_dataset/, Accessed Mar. 9, 2023, 9 pages.
H. Yu et al., "DAIR-V2X: A Large-Scale Dataset for Vehicle-Infrastructure Cooperative 3D Object Detection," IEEE/CVF Conference on Computer Vision and Pattern Recognition (CVPR), Jun. 2022, 10 pages.
AI Industry Research, "DAIR V2X," https://thudair.baai.ac.cn/index, Accessed Mar. 9, 2023, 5 pages.

\* cited by examiner

```
┌──────────────────── File overview ────────────────────┐
│ Type                  Document Array In Memory        │
│ Length                55                              │
│ Documents of the      True                            │
│ same category                                         │
│ Public attribute      ( 'id' , 'mime_type' 'uri' )    │
│ Multiple model data type  False                       │
└───────────────────────────────────────────────────────┘
```

```
┌──────────────── Attribute overview ────────────────┐
│                                       Does it have │
│ Attribute    Date type   #Unique value a null value?│
│ ─────────────────────────────────────────────────── │
│ id           ( 'str', )      55         False      │
│ Mime_type    ( 'str', )       1         False      │
│ uri          ( 'str', )      55         False      │
└────────────────────────────────────────────────────┘
```

FIG. 14

```
┌──────────────────── File overview ─────────────────────────────┐
│ Type                  Document Array In Memory                 │
│ Length                55                                       │
│ Documents of the      True                                     │
│ same category                                                  │
│ Public attribute      ( 'id' , 'tensor' , 'mime_type' , 'uri' , 'embedding' )│
│ Multiple model data type  False                                │
└────────────────────────────────────────────────────────────────┘
```

```
┌──────────────── Attribute overview ────────────────┐
│                                       Does it have │
│ Attribute    Date type    #Unique value a null value?│
│ ─────────────────────────────────────────────────── │
│ embedding    ( 'Tensor', )    55         False     │
│ id           ( 'str', )       55         False     │
│ Mime_type    ( 'str', )        1         False     │
│ tensor       ( 'ndarray', )   55         False     │
│ uri          ( 'str', )       55         False     │
└────────────────────────────────────────────────────┘
```

FIG. 15

METHOD, ELECTRONIC DEVICE, AND COMPUTER PROGRAM PRODUCT FOR ROAD MONITORING

RELATED APPLICATION

The present application claims priority to Chinese Patent Application No. 202310402962.9, filed Apr. 14, 2023, and entitled "Method, Electronic Device, and Computer Program Product for Road Monitoring," which is incorporated by reference herein in its entirety.

FIELD

Embodiments of the present disclosure relate to the field of computer technologies, and more particularly, relate to a method, an electronic device, and a computer program product for road monitoring.

BACKGROUND

Cellular-Vehicle to Everything (C-V2X) is a uniform connection platform and aims to provide low-latency Vehicle to Vehicle (V2V), Vehicle to Infrastructure (V2I), and Vehicle to Pedestrian (V2P) communication for vehicles. In order to handle use cases of C-V2X, such as safety, convenience, advanced driving assistance, and disadvantaged road users, a large amount of data needs to be transmitted and processed.

SUMMARY

According to example embodiments of the present disclosure, a technical solution for road monitoring is provided, which can improve the accuracy of warnings without increasing costs.

In a first aspect of the present disclosure, a method for road monitoring is provided. The method may include receiving, at a second node, a target image from a first node, where the target image is determined as being of a first category based on performing target detection on a road monitoring image obtained by the first node, and the second node is closer to a cloud end than the first node. The method further includes determining, at the second node, a second category of the target image, where the second category is a subcategory of the first category; and in response to the second category being a preset category, sending a warning corresponding to the second category to a terminal device associated with the road monitoring image. Implementation of the method provided by the first aspect can improve the accuracy of warnings without increasing costs.

In a second aspect of the present disclosure, an electronic device for road monitoring is provided. The electronic device includes a processor and a memory coupled to the processor and having instructions stored therein, wherein the instructions, when executed by the processor, cause the electronic device to perform operations including: receiving, at a second node, a target image from a first node, wherein the target image is determined as being of a first category based on performing target detection on a road monitoring image obtained by the first node, the second node is closer to a cloud end than the first node, and the first node is a roadside edge node. The operations further include determining, at the second node, a second category of the target image, where the second category is a subcategory of the first category; and in response to the second category being a preset category, sending a warning corresponding to the second category to a terminal device associated with the road monitoring image. Implementation of the electronic device provided by the second aspect can improve the accuracy of warnings without increasing costs.

In a third aspect of the present disclosure, a computer program product is provided. The computer program product is tangibly stored on a non-transitory computer-readable medium and includes machine-executable instructions, wherein the machine-executable instructions, when executed by a machine, cause the machine to perform the method according to the first aspect of the present disclosure.

It can be seen from the above description that according to the solution of embodiments of the present disclosure, the accuracy of warnings can be improved without increasing costs. It should be understood that this Summary is provided to introduce the selection of concepts in a simplified form, which will be further described in the Detailed Description below. The Summary is neither intended to identify key features or main features of the present disclosure, nor intended to limit the scope of the present disclosure.

BRIEF DESCRIPTION OF THE DRAWINGS

The above and other features, advantages, and aspects of embodiments of the present disclosure will become more apparent in conjunction with the accompanying drawings and with reference to the following Detailed Description. In the accompanying drawings, identical or similar reference numerals represent identical or similar elements, in which:

FIG. 14 shows an index overview of a dataset before encoding according to some embodiments of the present disclosure;

FIG. 15 shows an index overview of a dataset after encoding according to some embodiments of the present disclosure.

DETAILED DESCRIPTION

Figure 1:
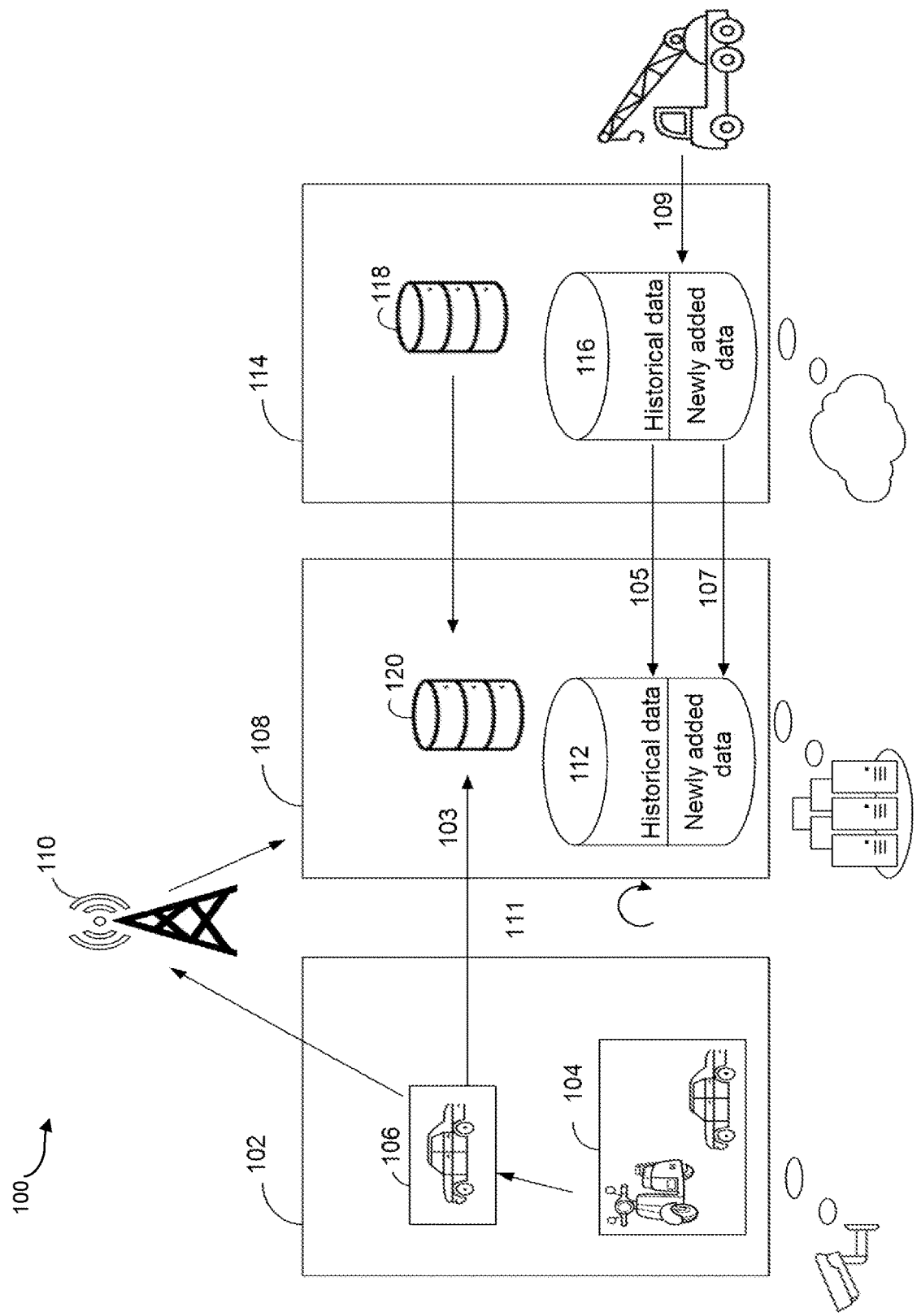
FIG. 1 shows a schematic diagram of an application scene according to some embodiments of the present disclosure.

Illustrative embodiments of the present disclosure will be described in more detail below with reference to the accompanying drawings. Although the accompanying drawings show some embodiments of the present disclosure, it should be understood that the present disclosure may be implemented in various forms, and should not be construed as being limited to the embodiments stated herein. Rather, these embodiments are provided for understanding the present disclosure more thoroughly and completely. It should be understood that the accompanying drawings and embodiments of the present disclosure are for exemplary purposes only, and are not intended to limit the protection scope of the present disclosure.

In the description of embodiments of the present disclosure, the term "include" and similar terms thereof should be understood as open-ended inclusion, that is, "including but not limited to." The term "based on" should be understood as "based at least in part on." The term "an embodiment" or "the embodiment" should be understood as "at least one embodiment." The terms "first," "second," and the like may refer to different or identical objects. Other explicit and implicit definitions may also be included below.

In a Cooperative Intelligent Transportation System (C-ITS), there is a large amount of data collected in autonomous vehicle and/or infrastructure, which can be used for many purposes, for example, these data can be used in scenarios such as accident warnings and road risk warnings that can warn users through terminal devices based on machine learning techniques and other methods. However, current warning methods have some problems. For example, centralized and one-stop traffic data can eliminate the time sensitive value of the data. Autonomous vehicle and/or infrastructure collect a large amount of valuable data, but how to find useful data in a large amount of data in a timely manner is a challenge. If the data cannot be mined in a timely manner, it may be archived or deleted after a certain period of time due to storage limitations and other reasons. For another example, classification of objects is still coarse-grained. On the one hand, the current accuracy of object classification in data is not high. On the other hand, with the development of industry, new object categories are constantly emerging, and current methods are difficult to identify new categories.

Therefore, the present disclosure provides a method, an electronic device, and a computer program product for road monitoring. The method for road monitoring includes receiving, at a second node, a target image from a first node, where the target image is determined as being of a first category based on performing target detection on a road monitoring image obtained by the first node, and the second node is closer to a cloud end than the first node. The method for road monitoring further includes determining, at the second node, a second category of the target image, where the second category is a subcategory of the first category; and in response to the second category being a preset category, sending a warning corresponding to the second category to a terminal device associated with the road monitoring image. Implementation of the method provided in embodiments of the present disclosure allows for low-cost coarse-grained classification of road monitoring images at a first node further away from a cloud end, fine-grained classification is carried out at a second node closer to the cloud end with higher computational capability, and a warning is sent to a terminal device when a second category obtained after fine-grained classification is a preset category. In this way, the accuracy of warnings is ensured, and the problem of the first node being far from the cloud end and having low computational capability, which is unsuitable for deployment of high-precision algorithms, is solved.

FIG. 1 shows a schematic diagram of an application scene 100 according to some embodiments of the present disclosure. The application scene 100 includes a far edge node 102, a near edge node 108, a 5G base station 110, and a cloud end 114. The far edge node 102 may correspond to a first node in a C-V2X system. The far edge node 102 may be used to acquire a road monitoring image 104, process the road monitoring image 104 to obtain a target image 106, and send target image 106 to the near edge node 108. In some examples, the far edge node 102 may be a roadside edge node in the C-V2X system, for example, the far edge node 102 may be a roadside camera included in the C-V2X system and/or a processor connected to the roadside camera. The near edge node 108 may correspond to a second node in the C-V2X system, and a trained classification model 112 and a near edge feature library 120 are included therein. The near edge node 108 may be used to process the target image 106. In some examples, the near edge node 108 may refer to a central processing edge node connected to the far edge node 102 in the C-V2X system. For example, the near edge node 108 may be a regional central processing unit used for managing all roadside edge nodes in a geographical area of the C-V2X system. The 5G base station 110 is used to connect the far edge node 102 and the near edge node 108 for supporting data transmission between the far edge node 102 and the near edge node 108. The cloud end 114 is used to manage the near edge node 108, and a trained classification model 116 and a cloud end feature library 118 are included, for example, the cloud end 114 may be used to manage feature libraries and models in the near edge node 108.

Figure 2:
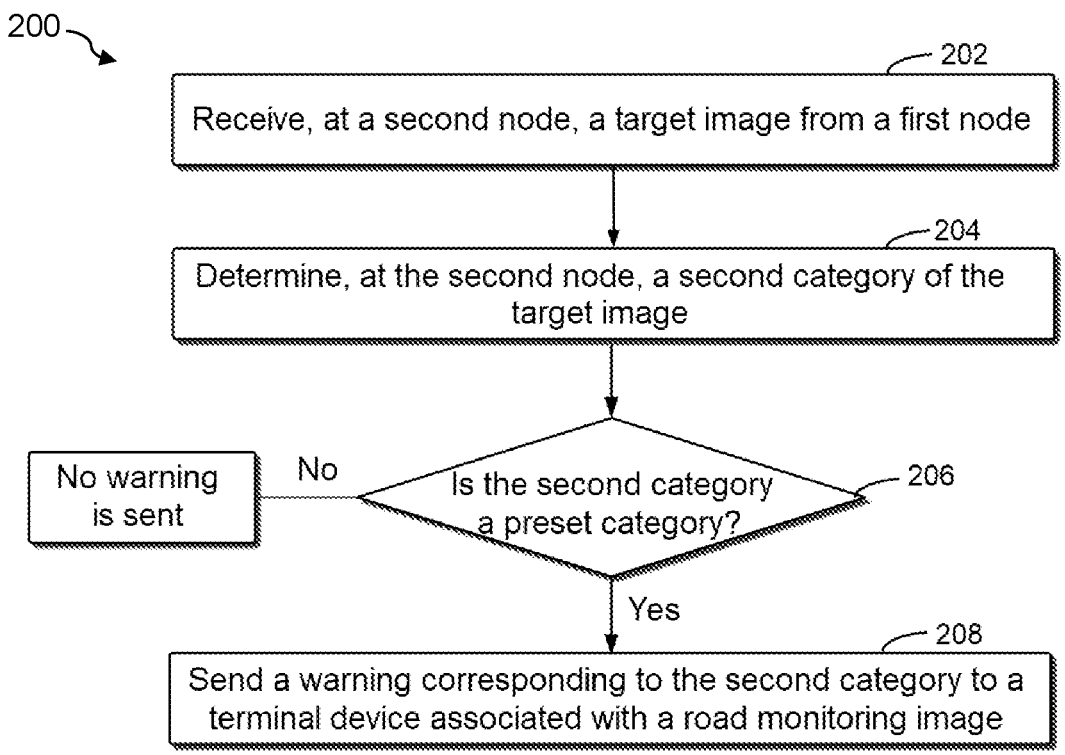
FIG. 2 shows a flow chart of a method for road monitoring according to some embodiments of the present disclosure.

The application scene 100 is used to implement a method 200 for road monitoring in FIG. 2. At block 202, a target image is received from a first node at a second node, where the target image is determined as being of a first category based on performing target detection on a road monitoring image obtained by the first node, and the second node is closer to a cloud end than the first node. At block 204, a second category of the target image is determined at the second node, where the second category is a subcategory of the first category. At block 206, it is determined whether the second category is a preset category. If the second category is the preset category, at block 208, a warning corresponding to the second category is sent to a terminal device associated with the road monitoring image; otherwise, no warning will be sent.

The method 200 can be executed by one or more electronic devices. The electronic devices may include, but are not limited to, personal computers (PCs), server computers, handheld or laptop devices, mobile terminals, multiprocessor systems, or combinations thereof. Embodiments of the present disclosure do not make any limitation to the device type and the like of the electronic device that implements the method 200. It should be understood that, in embodiments of the present disclosure, the method 200 may be implemented by an entity device or may be implemented by a plurality of entity devices together. It can be understood that a primary component implementing the method 200 may be a logical function module in an entity device, or may be a logical function module composed of a plurality of entity devices. It should be understood that, in the following embodiments of the present disclosure, the steps in the method provided in embodiments of the present disclosure may be performed by one entity device, or the steps in the method provided in embodiments of the present disclosure may be performed by a plurality of entity devices cooperatively, which is not limited in embodiments of the present disclosure. In some embodiments, the electronic device may include multiple applications using different programming languages. It should be understood that the method 200 may also include additional blocks that are not shown and/or may omit blocks that are shown, and the scope of the present disclosure is not limited in this regard.

Figure 3:
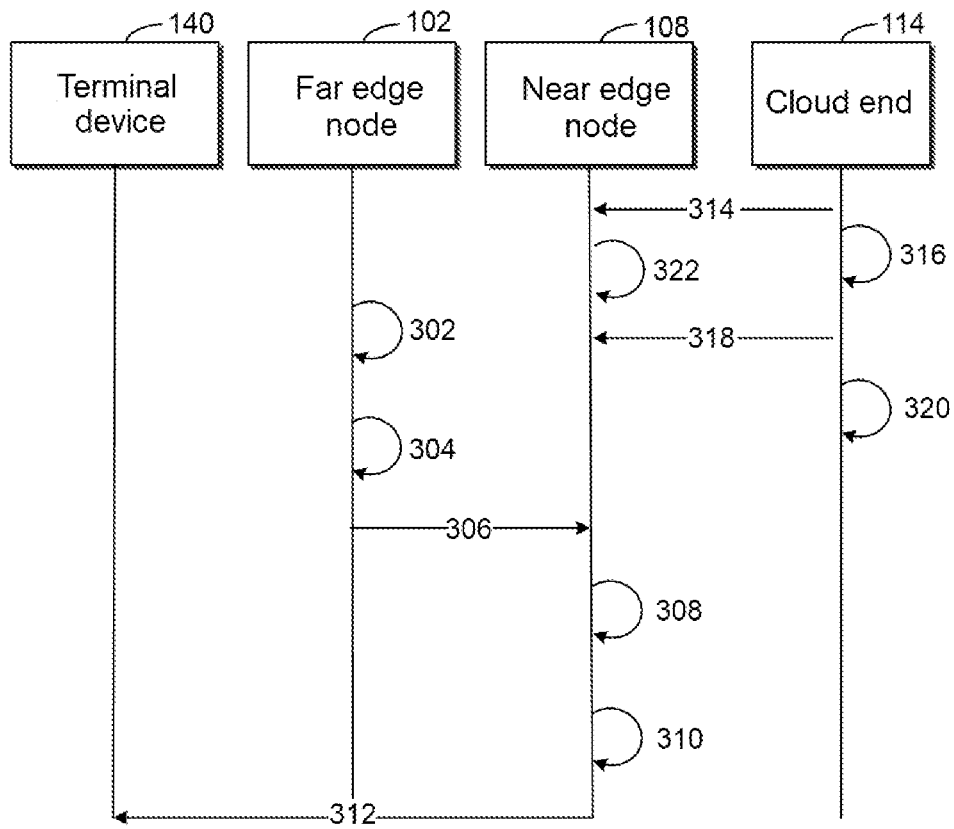
FIG. 3 shows an interaction diagram of a method for road monitoring according to some embodiments of the present disclosure.

The method provided in FIG. 2 is described in detail below based on FIG. 1 and interaction diagram FIG. 3.

With reference to FIG. 1, the far edge node 102 first acquires 302 the road monitoring image 104. Subsequently, the far edge node 102 performs target detection on the road monitoring image 104 to determine 304 a target image of a superordinate category, where the superordinate category may correspond to the first category in FIG. 1. In some examples, the far edge node 102 may determine whether the road monitoring image 104 has an object of the superordinate category. If yes, the road monitoring image 104 can be determined as the target image 106 with a category being the superordinate category, and the target image 106 is sent 306 to the near edge node 108. The target image 106 may be sent via a cellular wireless network using 5G base station 110 as a medium shown in FIG. 1, or by other methods. The superordinate category can be different according to different requirements for actual scenes. In some other examples, a purpose of the present disclosure may be sending a warning to users of existence of nearby motor vehicles with high risks such as a forklift, a large truck, and the like. At this time, the superordinate category may refer to a relatively coarse-grain classification category "motor vehicles." In this example, to facilitate understanding, the superordinate category being a motor vehicle is taken as an example for explanation if no special statement is made, but it should not be understood as a limitation to the present disclosure.

In this example, the far edge node 102 may invoke a trained target detection model that can detect a target detection model of an object of the superordinate category to determine whether the road monitoring image 104 has the object of the superordinate category. If yes, the road monitoring image 104 can be used as the target image 106 which is determined as the superordinate category.

Alternatively, in some embodiments, an image area containing an object of the superordinate category in the road monitoring image 104 may be cropped out to obtain the target image 106 determined as the superordinate category, so as to further reduce, by reducing the size of the sent image, the bandwidth and latency occupied by the far edge node 102 when subsequently sending the target image 106 to the near edge node 108. Meanwhile, the amount of data that needs to be processed by the near edge node 108 can be reduced when processing the target image 106, thereby improving efficiency. It should be understood that in this case, if the present disclosure is also used for other purposes, such as sending warnings to users of nearby traffic signs that require attention, such as "stop" signs, etc., in addition to a motor vehicle, the far edge node 102 can also perform target detection on the road monitoring image 104 to determine whether there are traffic signs present, crop out an image area containing traffic signs in the road monitoring image 104, and send the cropped out sub-image to the near edge node 108 so as to perform processing similar to that of the target image 106 for warning of traffic signs that require attention.

In some embodiments, after receiving the target image 106 from the far edge node 102, the near edge node 108 may perform fine-grain classification 308 on the target image 106 to determine the subordinate category of the target image 106, where the superordinate category is a subcategory of the superordinate category, and the subordinate category may correspond to the second category in FIG. 1. Taking that the purpose of embodiments of the present disclosure may be sending warnings to users of existence of nearby high-risk motor vehicles as an example for explanation, in the example, the subordinate category may refer to a subcategory of the superordinate category "motor vehicles," such as "a forklift," "a large truck," "a car," and the like. The subordinate category is determined based on the category of the object in the target image. If the target image includes a forklift, the subordinate category of the target image 106 is a forklift, and if the target image 106 includes a car, the subordinate category of the target image 106 is a car. In some examples, the near edge node 108 may process the target image 106 by means of a target detection model with higher precision to determine the subordinate category of the target image 106. For example, in this example, the subcategory of "motor vehicles" can be used as a label to train a target detection/classification model, and the subordinate category of the target image 106 is determined by means of the trained target detection/classification model. Identifying the ultrafine classification of objects can help increase the accuracy of data and optimize warnings or other necessary processes.

Figure 4:
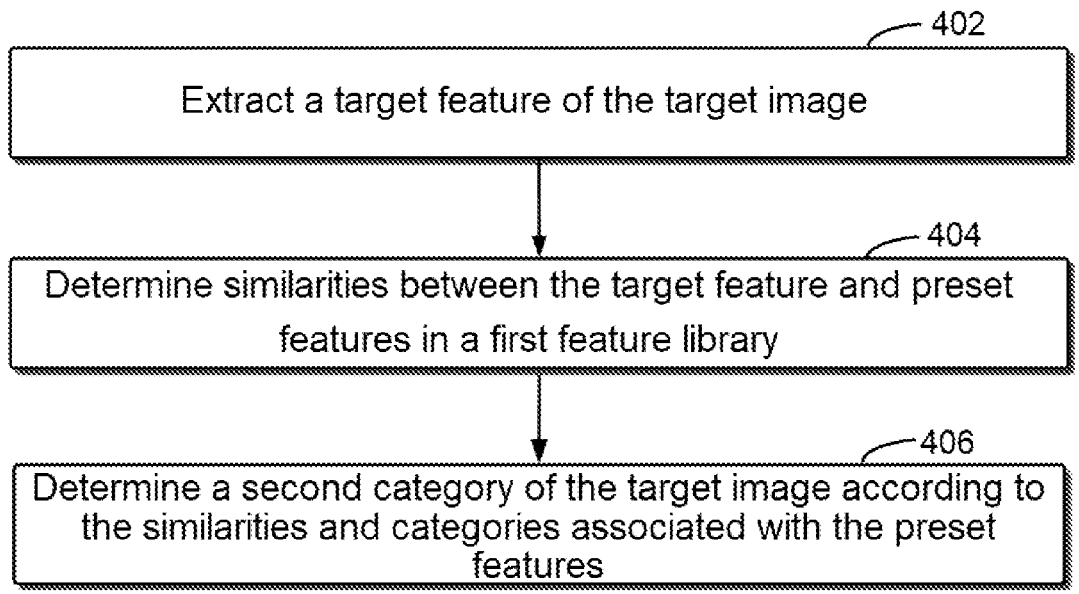
FIG. 4 shows a flow chart of determining a second category according to some embodiments of the present disclosure.

In some embodiments, the method of determining a subordinate category based on neural search 103 shown in FIG. 4 can be used. At block 402, the near edge node 108 may extract a target feature of a target image. At block 404, the near edge node 108 determines similarities according to the target feature and preset features in a first feature library at the near edge node 108. At block 406, a second category of the target image is determined according to the similarities and categories associated with the preset features. By means of the method based on the neural search 103, the high training cost required to determine the subordinate category via a model can be avoided. The method is explained in detail below.

The target feature may be an image feature and/or a text embedding feature in the target image 106, and can be extracted by the trained classification model 112 at the near edge node 108. These preset features may be image features and/or text embedding features extracted from source monitoring images when constructing the near edge feature library 120, or text embedding features of text labels added according to image information of the source monitoring images.

Figure 5:
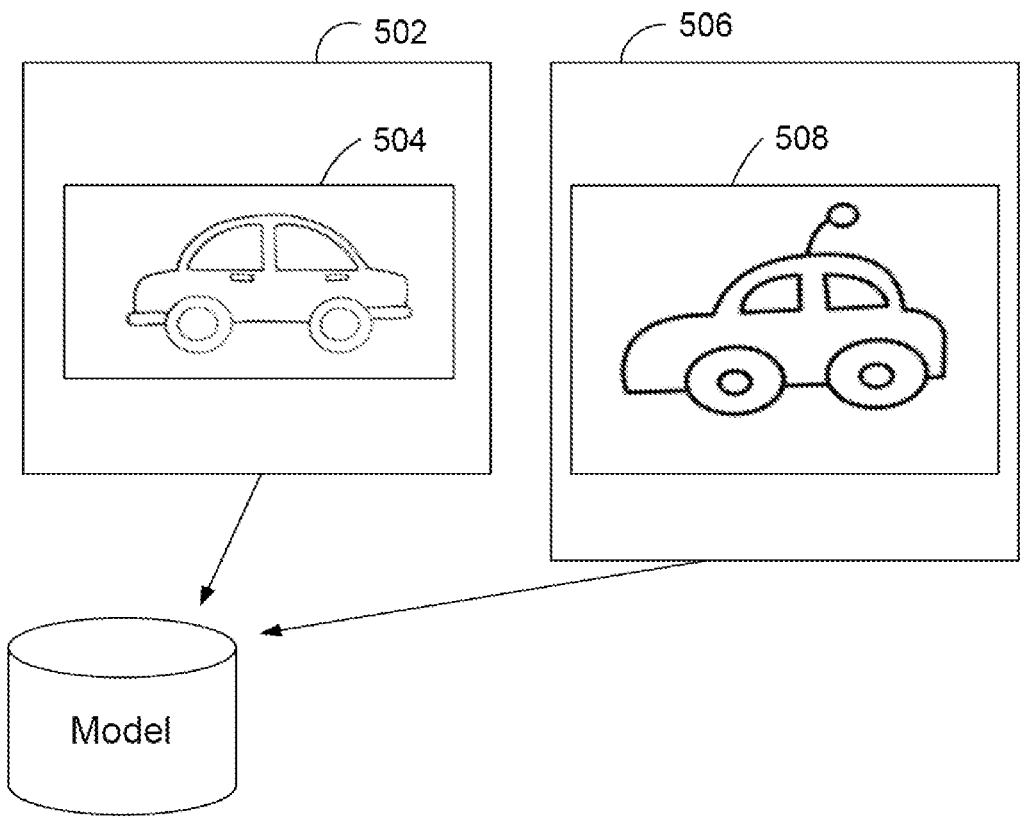
FIG. 5 shows a schematic diagram of neural search being an image-to-image search according to some embodiments of the present disclosure.

In some embodiments, both the target feature and the preset feature are image features, that is, the neural search is an image-to-image search, and can directly compare and query the embedding of images. In this case, a first classification model can be trained, an obtained final classification layer of the model is deleted, a remaining network is used as the trained classification model 112, and preset features for construction are extracted by means of the trained classification model 112. It should be understood that the first classification model can be used to extract image features. It should be noted that a cropping method can usually be used to crop a Region of Interest (ROI) in the road monitoring image 104 and an ROI in the source monitoring image as a target image and a new source monitoring image, and then only the embedding of these images is compared and queried. For example, with reference to FIG. 5, an ROI 504 in a road monitoring image 502 can be cropped out as the target image by means of the model, and an ROI 508 in a source monitoring image 506 can be cropped out as the new source monitoring image.

In some other embodiments, both the target feature and the preset features are text embedding features, that is, a neural search is a text-to-text search, and the embedding of the text in the target image and the embedding of a text label of the source monitoring images can be compared and queried. In this case, a second classification model can be trained, an obtained final classification layer is deleted, a remaining network is used as a trained classification model 112, and the preset features for construction are extracted by means of the trained classification model 112. It should be understood that the second classification model can be used to extract text embedding features.

In some other embodiments, the target feature is a text embedding feature and the preset features are image features, that is, a neural search is a text-to-image feature. In this case, a third classification model can be trained, an obtained final classification layer of the model is deleted, a remaining network is used as a trained classification model 112, and the preset features for construction are extracted by means of the trained classification model 112. It should be understood that the third classification model may be a cross modal model.

It should be understood that to ensure uniformity of feature extraction, different models can be used to extract the target feature and the preset features for each neural search situation. That is, the first classification model, the second classification model, and the third classification model can be different models.

For the case where the preset feature is the text embedding feature of the text label, text labels can be obtained through various methods.

Figure 6:
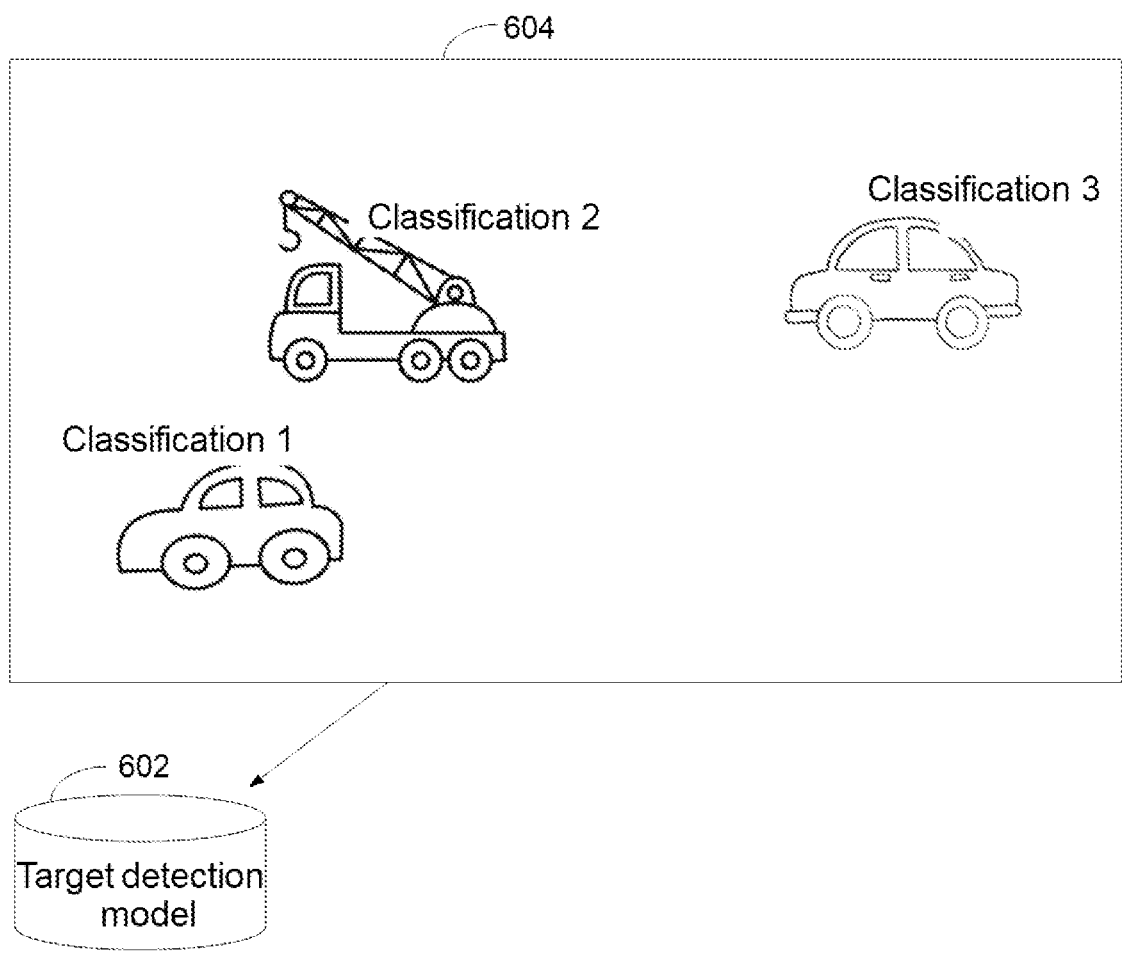
FIG. 6 shows a schematic diagram of acquiring a text label according to some embodiments of the present disclosure.

In some embodiments, the text labels can be obtained by means of target detection. For example, with reference to FIG. 6, a target detection model 602 and public data 604 can be used to detect general objects related to traffic scenes in source monitoring images, and the detected "class" information (not all shown) can be used as text labels.

Figure 7:
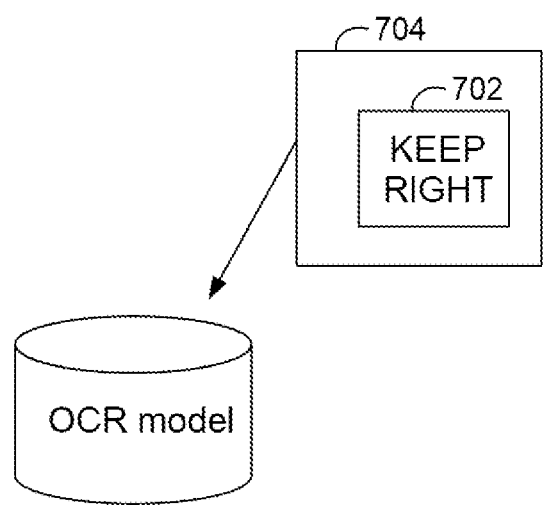
FIG. 7 shows another schematic diagram of acquiring a text label according to some embodiments of the present disclosure.

In some other embodiments, the text labels can be obtained by means of an optical character recognition (OCR) model. For example, with reference to FIG. 7, an advanced OCR model can be used to annotate a source monitoring image 704 based on extracted text and words 702 to obtain the text labels.

In some other embodiments, the text labels can be obtained manually or by means of predefined rules. For example, some car brand and model information can be determined based on organization names/methods of an image folder obtained after collecting the source monitoring images and manually classifying and organizing them.

When the similarities are compared, different comparison methods can be adopted according to different categories of neural searches. For example, when both the target feature and the preset features are image features or text embedding features, a distance (such as the Euclidean Distance, the Manhattan Distance, and the like) between the target feature and the preset feature can be calculated. For another example, when the target feature is a text embedding feature and the preset features are image features, comparison can be performed by means of a multimodal model.

By means of the method of pre-constructing a feature library in this embodiment, a large amount of data collected by autonomous vehicles and V2X infrastructure can be timely mined to avoid archiving or deletion of these data due to storage restrictions or policy provisions. Meanwhile, it can avoid the problem of traditional heuristic methods having overly broad results and reduce the use of symbol search. Furthermore, the process of constructing the feature library can be carried out offline without occupying the bandwidth of C-V2X for online use.

After obtaining the similarities, the near edge node 108 may determine to perform data mining according to the similarities and the categories associated with the preset features so as to determine the subordinate category of the target image 106. It should be understood that the category associated with each preset feature is one of the subcategories of the superordinate category and is determined by the categories of the objects included in the source monitoring images. The categories associated with the preset features may be acquired manually, by means of a machine learning method, or other methods when the near edge feature library 120 is constructed, and can also be stored in the near edge feature library 120. In some examples, the near edge node 108 may determine the preset feature with the greatest similarity and determine the category associated with the preset feature as the subordinate category of the target image.

Figure 8:
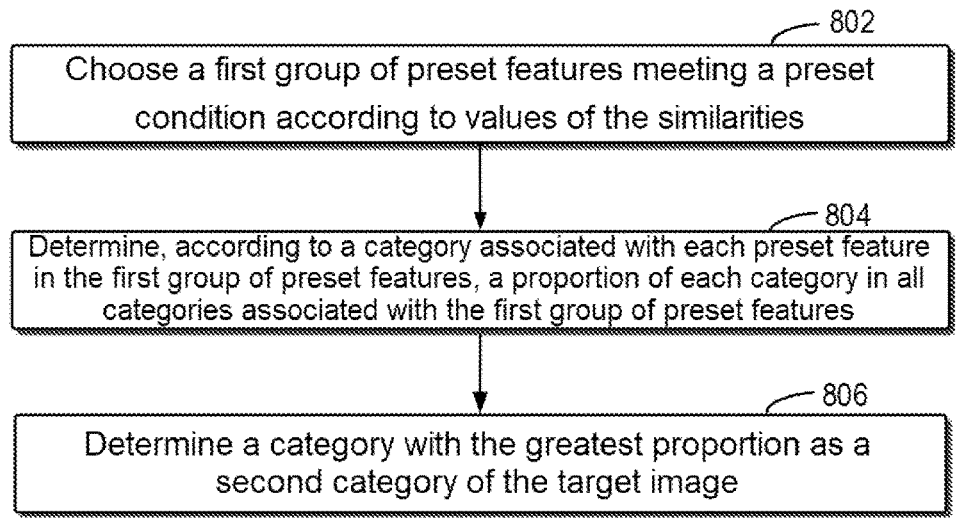
FIG. 8 shows a flow chart of determining a second category according to some other embodiments of the present disclosure.

In some embodiments, to improve the accuracy for determining a subordinate category, a method in FIG. 8 can be adopted. FIG. 8 shows a method for determining a subordinate category. After obtaining similarities between preset features and a target feature, at block 802, a first group of preset features meeting a preset condition are chosen according to values of the similarities. At block 804, a proportion of each category in all categories associated with the first group of preset features is determined according to a category associated with each preset feature in the first group of preset features. At block 806, a category with the greatest proportion is determined as a second category of the target image. In some examples, a preset condition may be sorting the preset features according to the values of the similarities and choosing preset features ranked in the top n of the similarities from the highest to lowest as the first group of preset features.

Figure 9:
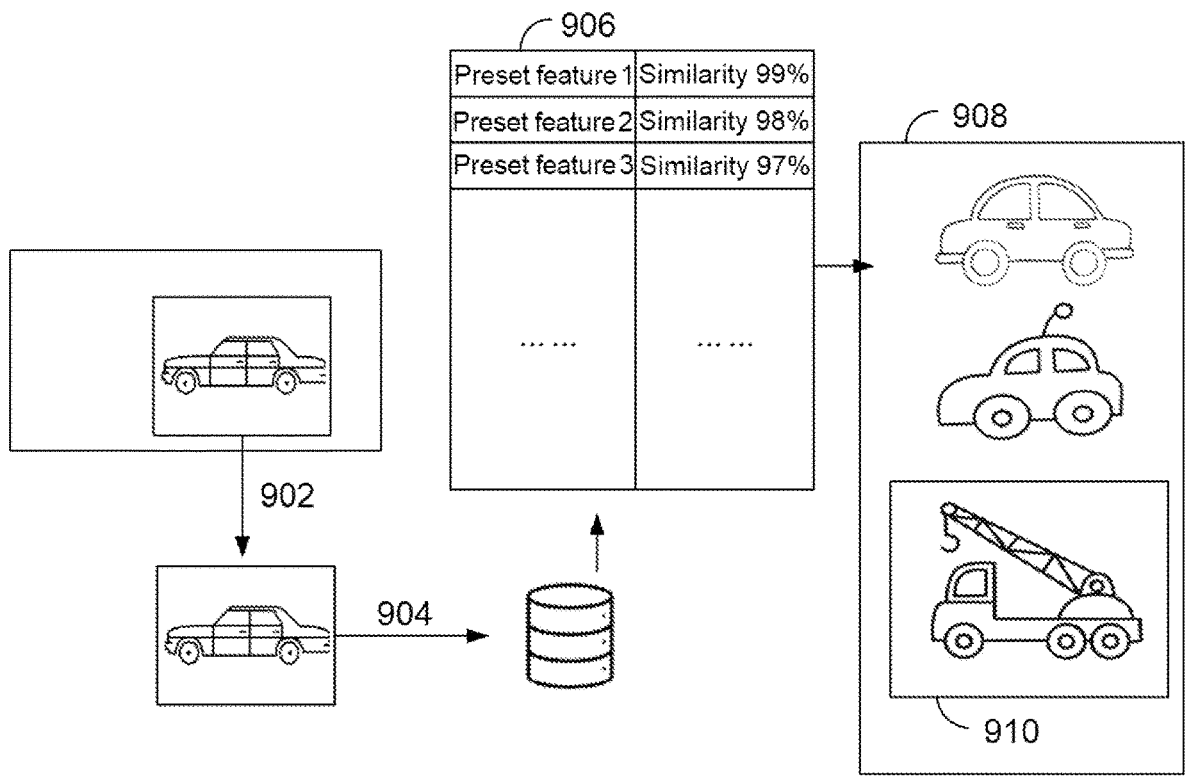
FIG. 9 shows an architecture diagram of a workflow for query according to some embodiments of the present disclosure.

To facilitate understanding, with reference to FIG. 9, FIG. 9 shows an architecture of a workflow of a query by taking an image-to-image neural search as an example. In this embodiment, the far edge node 102 obtains the target image 106 by means of target detection 902, and the near edge node 108 queries 904 the target image 106 in the near edge feature library 120 based on a similarity comparison method of the Euclidean distance, so as to obtain a query result 906 after the sorting according to the values of the similarities, and 908 is an image display of the query result 906. It can be seen from 908 that the query result at this time may still have certain errors 910, which can be solved by subsequent fine-tuning.

It should be understood that the explanation of the preset condition in the present disclosure should not be used as a limitation to the present disclosure. For example, the preset condition can also refer to sorting, according to values of the similarities, the other preset features than the preset feature with the highest similarity, and selecting the other preset features ranked in the top n of the similarities from the highest to lowest as the first group of preset features.

Returning to FIG. 3, after determining the subordinate category of the target image 106, the near edge node 108 can judge 310 whether the subordinate category is a preset category that needs warning. For example, when the purpose of the present disclosure is to send warnings to users of nearby high-risk motor vehicles, such as a forklift, the preset category refers to "a forklift"; if the second category is "a forklift," the near edge node 108 sends 312 a warning (for example, a warning in the form of text, voice, images, etc., like "there is a forklift around, pay attention," etc.) corresponding to the subordinate category, i.e., "a forklift," to a terminal device 140 associated with a road monitoring image. The terminal device 140 associated with the road monitoring image may refer to a terminal device of one or more users who need to be warned and who are determined based on traffic conditions in the road monitoring image. For example, the terminal device 140 can be a smartphone, a desktop computer, an on-board computer, etc. of users who need to be warned, which is not limited in the present disclosure. In some examples, the near edge node 108 can first determine an image capture location of the road monitoring image and then send a warning corresponding to the subordinate category to terminal devices of users located around the image capture location.

In some embodiments, the near edge feature library 120 at the near edge node 108 in the above text and the trained classification model 112 for extracting the target feature can be received from the cloud end 114, that is, "image features extracted from the source monitoring images or text features of text labels added according to image information of the source monitoring images" above. A processing flow of determining categories associated with the preset features and training the trained classification model can be executed at the cloud end 114. After execution, the cloud end 114 may construct a cloud end feature library at the cloud end 114 based on the extracted preset feature and categories associated with the preset features, and send 314 the preset features (for example, all the preset features in the cloud end feature library) and associated categories in the cloud end feature library, and a trained classification model to the near edge node 108, so as to construct a near edge feature library at the near edge node 108 and acquire a trained classification model at the near edge node 108.

The method of this embodiment can achieve the transfer, sharing, and continuous learning of the cloud end knowledge in the C-V2X system, without the need to retrain the model through a complete dataset, in the context of rapid industrial development and the continuous increase of new refined object categories, such as the subcategories of a motor vehicle. This enables the near edge node 108 to adapt to constantly changing traffic conditions in a timely manner. For example, the cloud end 114 can obtain the trained classification model 116 by means of training, extract preset features for constructing the cloud end feature library 118 based on the trained classification model 116, and determine categories associated with the preset features, so as to construct 109 the cloud end feature library 118. Then, the trained classification model 116 and the cloud end feature library 118 are sent to the near edge node 108, so as to acquire the trained classification model 112 at the near edge node 108 and construct the near edge feature library 120. When the near edge node 108 receives a target image from the far edge node 102, a target feature can be extracted based on the received trained classification model 112, and a subordinate category of the target image 106 can be determined based on the target feature, as well as the preset features and the categories associated with the preset features in the near edge feature library 120. When it is necessary to add new knowledge, that is, to add a new preset feature associated with a newly added category, only fine-tuning 316 is performed on the trained classification model 116 in the cloud end 114 based on the newly added monitoring image used to extract the new preset feature and the newly added category, so as to make the trained classification model 116 to further learn new data based on historical data already learned and send 105 (318) the fine-tuned classification model to the near edge node 108 for updating the trained classification model 112; therefore, knowledge transfer 107 of the newly added category can be completed, allowing the trained classification model 112 to further learn the newly added data based on the historical data already learned.

Figure 10:
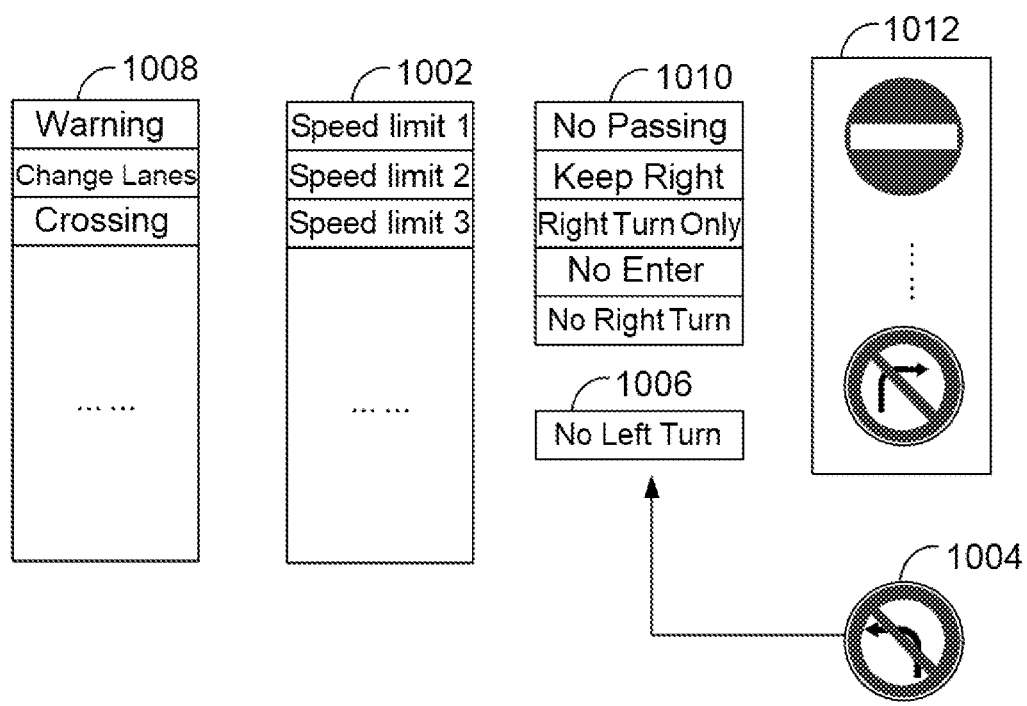
FIG. 10 shows a schematic diagram of a newly added category according to some embodiments of the present disclosure.

In addition, in order to supplement a cloud end database when adding new knowledge, the new preset feature can be extracted by means of the fine-tuned classification model, and the new preset feature and the new category can be added 320 to the cloud end feature library 118. It should be understood that the timing sequence of 316, 318, and 320 in interaction diagram FIG. 3 is only an exemplary illustration and should not be understood as a limitation to the present disclosure. For easier understanding, with reference to FIG. 10, FIG. 10 is a schematic diagram of adding a new subcategory 1006 for some categories 1002 in a feature library based on a newly added monitoring image 1004, where the categories 1002 can also be the subcategory of a category 1008, and subcategories 1010 that already exist under the categories 1002 correspond to a source monitoring image 1012 respectively.

Figure 11:
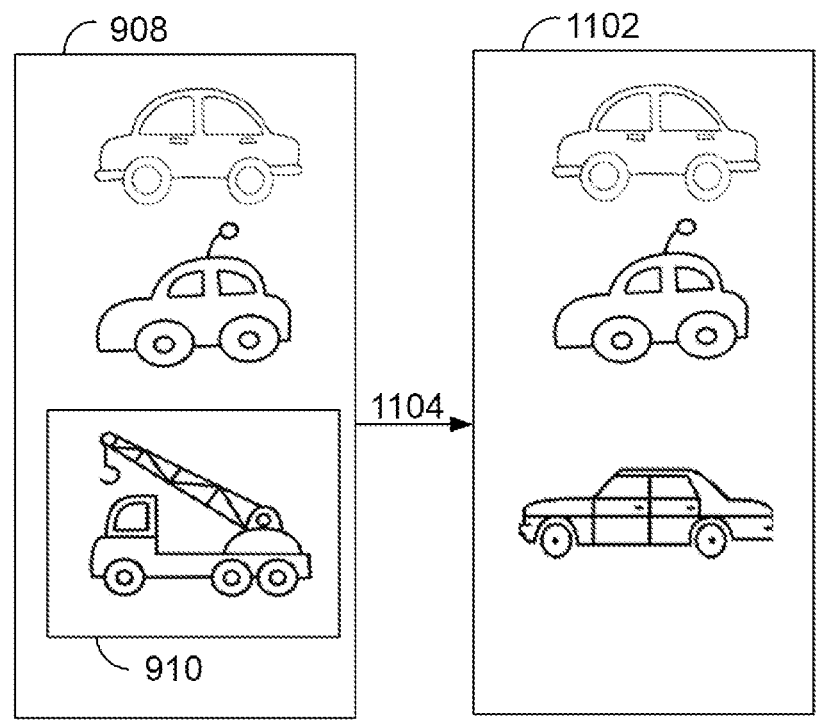
FIG. 11 shows a schematic diagram of a fine-tuned effect according to some embodiments of the present disclosure.

To visually demonstrate the effect of fine-tuning, taking FIG. 11 as an example for illustration, a FIG. 9-based scene in FIG. 11 shows an effect after fine-tuning 1104, and it can be seen from a difference between an image representation 1102 of a query result after fine-tuning 1104 and an image representation 908 of a query result before fine-tuning 1104 that fine-tuning 1104 can effectively improve the accuracy of query and avoid the occurrence of an error 910.

In some cases, the cloud end 114 can send a part of the preset features in the cloud end feature library 118 to the near edge node 108, so as to make the near edge feature library 120 at the near edge node 108 to be a subset of the cloud end feature library 118. In this case, in response to the near edge node 108 determining that each of the similarities is less than a preset similarity threshold, the target image 106 is sent to the cloud end 114. The cloud end 114 determines the subordinate category of the target image 106 according to the target feature in the target image 106, the preset features in the cloud end feature library 118, and the categories associated with the preset features, and the subordinate category of the target image 106 is received from the cloud end 114, so as to further determine in a complete feature library, thereby reducing storage costs at the near edge node 108 and data transmission costs of transmitting the preset feature from the cloud end 114 to the near edge node 108.

Figure 12:
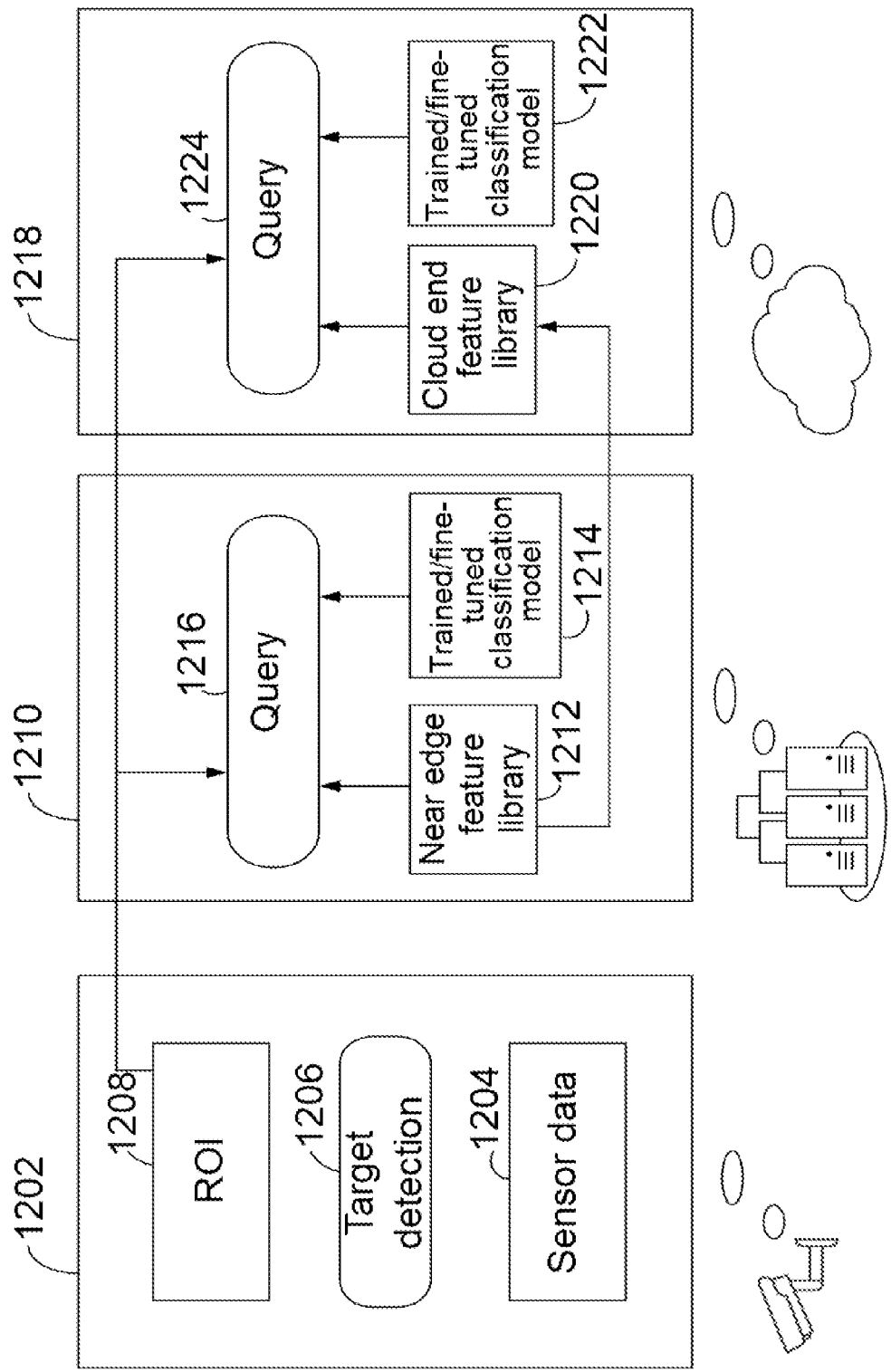
FIG. 12 shows an architecture diagram of performing real-time decision according to some embodiments of the present disclosure.

With reference to FIG. 12, FIG. 12 shows an architecture diagram of performing real-time decision in this case. A far edge node 1202 in FIG. 12 is responsible for performing target detection 1206 based on sensor data 1204 to acquire an ROI 1208 in a road monitoring image, that is, performing coarse-grain classification to acquire a target image. Then, the far edge node 1202 sends the ROI 1208 to a near edge node 1210. The near edge node 1210 is responsible for performing query 1216 of fine-grain classification based on a near edge feature library 1212 at the near edge node 1210 and a trained/fine-tuned classification model 1214. The near edge feature library 1212 and the trained/fine-tuned classification model 1214 are respectively from a cloud end feature library 1220 at a cloud end 1218 and a trained/fine-tuned classification model 1222. The near edge feature library 1212 is a subset of the cloud end feature library 1220. In response to the near edge node 1210 determining that each of the similarities is less than a preset similarity threshold, a target image is sent to the cloud end 1218, and the cloud end 1218 performs query 1224 of fine-grain classification to determine a subordinate category of the target image, and a subordinate category of the target image is received from the cloud end 1218.

In some examples, if the source monitoring image is an image associated with a geographical area corresponding to the near edge node 108, fine-tuning can be executed by the near edge node 108 itself in addition to the cloud end 114. For example, when a part of the preset features in the cloud end feature library 118 is chosen at the cloud end 114 based on the principle and sent to the near edge node 108 so as to construct the near edge feature library 120 that is a subset of the cloud end feature library 118, to avoid generalization of the trained classification model at the near edge node 108, localized fine-tuning 111 (for example, 322 in FIG. 3) can be performed on the trained classification model at the near edge node 108 based on the source monitoring images and the categories associated with the preset features. Then, the target feature can be obtained by means of the fine-tuned classification model based on the target image. The association with the geographical area may refer to that content in an image is associated with the geographical area, for example, images collected in the geographical area are images associated with the geographical area. In some examples, the localized fine-tuning can make the fine-tuned classification model more sensitive to objects that have appeared in the geographic area, and feature extraction more accurate. It should be understood that the timing sequence of 322 in interaction diagram FIG. 3 is only an exemplary illustration and should not be understood as a limitation to the present disclosure.

Figure 13:
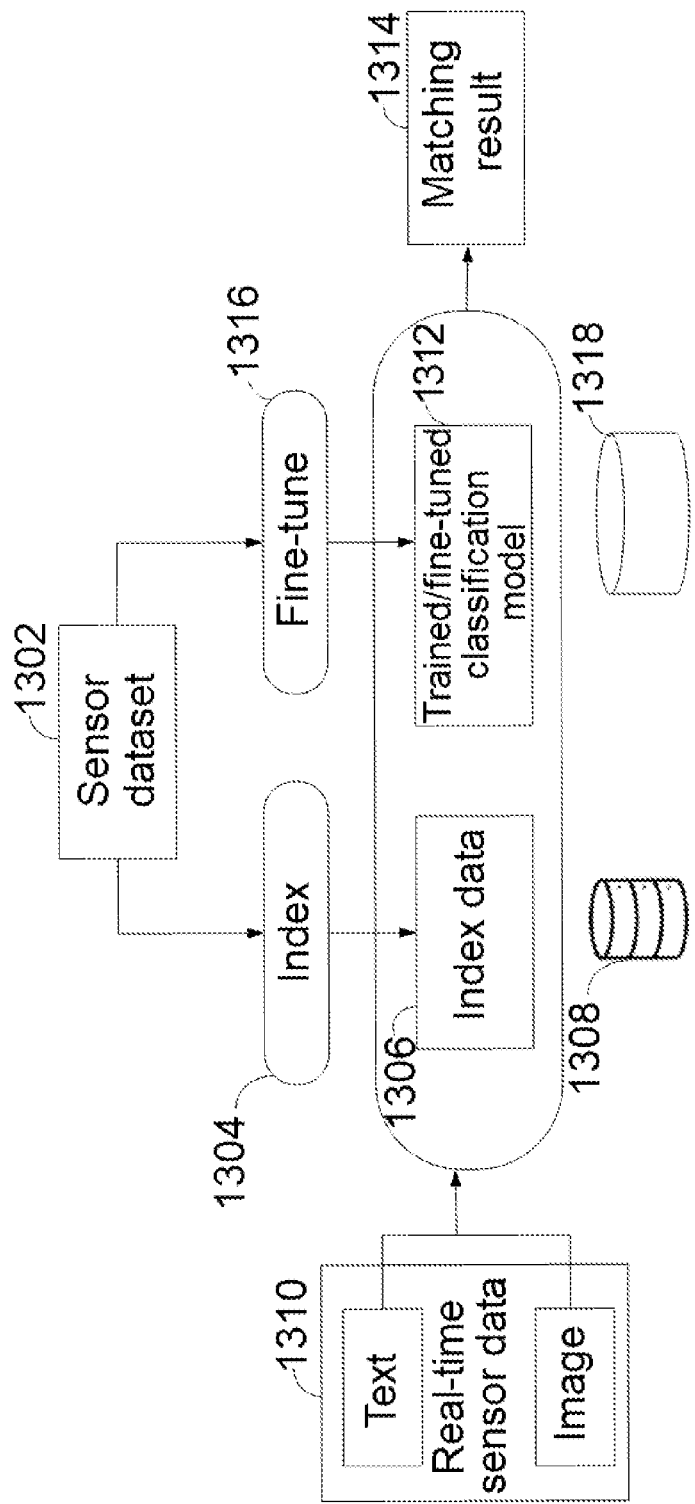
FIG. 13 shows an overall workflow diagram of a C-V2X system according to some embodiments of the present disclosure.

In order to make the present disclosure clearer, an overall workflow diagram FIG. 13 for implementing a C-V2X system of the present disclosure is also provided, which includes three main work contents: indexing and content querying of the dataset, continuous model fine-tuning, and dataset reindexing.

The C-V2X system can be used for indexing the dataset. The indexing of the dataset is used to construct a feature library. First, a sensor dataset 1302 can be indexed 1304 by means of a trained/fine-tuned classification model to index preset features, and the trained/fine-tuned classification model can be a pretrained model. The preset features after indexing will be stored as index data 1306 in a database to construct a feature library 1308. For example, a video clip from the dataset in an open-source database can be encoded using the following code:

```
Docs = DocumentArray.from_files ('LISA/vid10/annotations/*.png')
_embedder_ModelX = torchvision.models.ModelX(pretrained=True)
_embedder_ModelX.fx = (nn.Identity ( ) )
docs.embed (_embedder_ModelX, device='cuda')
``` where LISA, vid10, and annotations respectively refer to a dataset and folder names of folders related to the dataset, and * refers to a file name of a video frame in a video clip. Model X refers to a model used for encoding. The basic information of the dataset can include categories of "URI" and "MIME."

After the dataset is embedded, a tensor and information obtained by encoding will be added to the dataset. It should be understood that the process of constructing the feature library can be carried out offline. By indexing the dataset, necessary structured information can be added to unstructured data, which helps with subsequent data processing. In order to facilitate understanding of the overview of the data in the dataset index before and after encoding, FIGS. 14 and 15 are provided as references. FIG. 14 shows an overview of the dataset index before encoding, and FIG. 15 shows an overview of the dataset index after encoding. After comparing FIGS. 14 and 15, it can be seen that by encoding, tensor and embedding attributes can be added to the dataset index.

The C-V2X system can also be used for content query. The content query is used to execute the method of FIG. 4. During each query process, real-time sensor data 1310 containing text and images is searched and is also encoded as features by means of the trained/fine-tuned classification model 1312, and then a difference distance (such as the Euclidean distance) between the query and the index data 1306 in the feature library 1308 is calculated. The smaller the distance, the higher the similarity. A matching result 1314 sorted by distances will be returned. It should be understood that the trained/fine-tuned classification model in the index of the dataset can be the same model as the trained/fine-tuned classification model 1312. It should be understood that the process of content query can be conducted online at nodes or the cloud end.

The C-V2X system can also be used for continuous model fine-tuning and dataset reindexing. Although a basic machine model has encoding and matching capabilities, continuous fine-tuning 1316 on the trained/fine-tuned classification model 1312 is still utilized to obtain a fine-tuned model 1318, so as to better transfer knowledge from existing datasets. Different search methods will choose different models for encoding. In addition, the present disclosure has excellent scalability. When a new category is introduced into a specific category, the model can be quickly adjusted using only the new category, without requiring a long time to complete the training of the complete dataset. It should be understood that the process of content query can be conducted online at nodes or the cloud end.

According to the various embodiments of the present disclosure and their combined embodiments described above, the efficiency of configuring functional states can be improved. It should be understood that the embodiments illustrated in FIG. 1 to FIG. 15 above are only illustrative. According to practical applications, the architecture or processes illustrated in FIG. 1 to FIG. 15 may have other different forms and may also include more or fewer one or more functional modules and/or units, which can be partially or completely implemented as hardware modules, software modules, firmware modules, or any combination thereof. This is not limited in embodiments of the present disclosure.

It can be understood that the specific names and/or protocols of the various components of the system described herein are intended only to help those skilled in the art better understand the ideas of the present disclosure and are not intended to limit the scope of the present disclosure in any way. Moreover, in other embodiments, additional components may be included, and/or alternative components with the same or similar functions.

Figure 16:
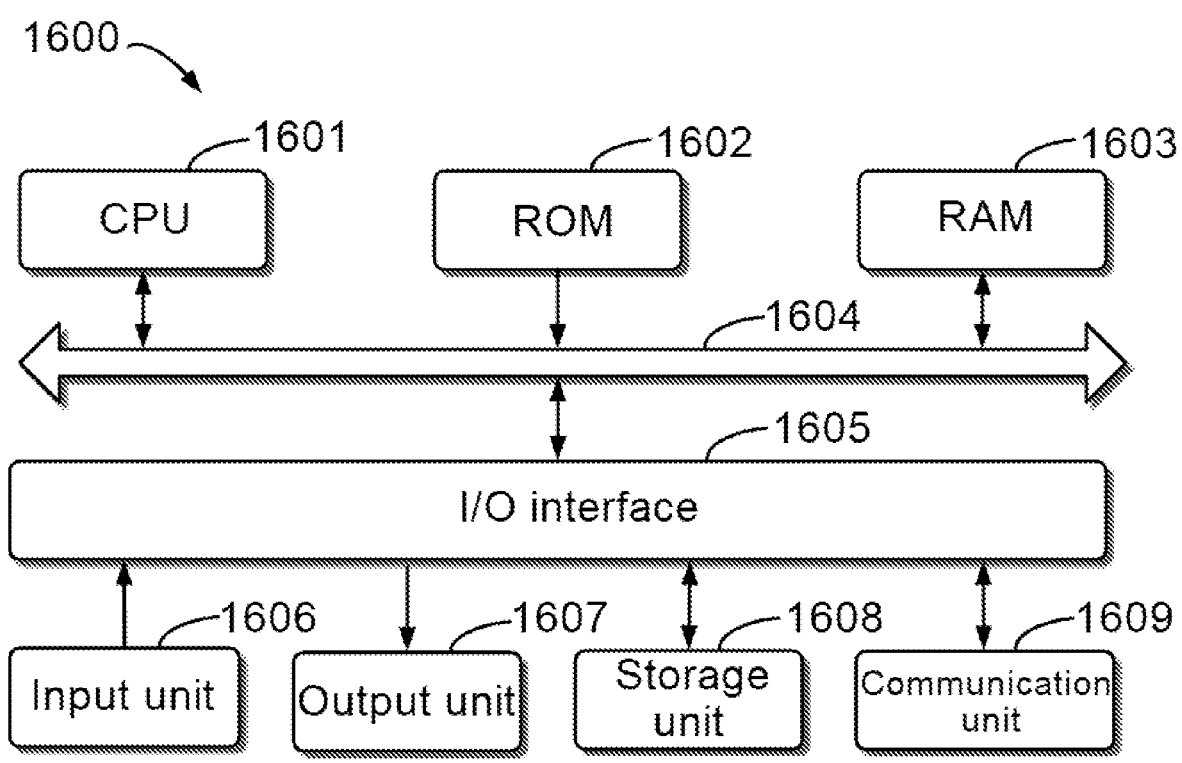
FIG. 16 shows a block diagram of a device that can be used to implement embodiments of the present disclosure.

FIG. 16 shows a block diagram of an example device 1600 that can be used to implement embodiments of the present disclosure. The device 1600 may be implemented as a server or a PC, and the specific implementation type of the device 1600 is not limited in embodiments of the present disclosure. As shown in FIG. 16, the device 1600 includes a central processing unit (CPU) 1601 that may perform various appropriate actions and processing according to computer program instructions stored in a read-only memory (ROM) 1602 or computer program instructions loaded from a storage unit 1608 to a random access memory (RAM) 1603. Various programs and data required for operations of the device 1600 may also be stored in the RAM 1603. The CPU 1601, the ROM 1602, and the RAM 1603 are connected to each other through a bus 1604. An input/output (I/O) interface 1605 is also connected to the bus 1604.

A plurality of components in the device 1600 are connected to an I/O interface 1605, including an input unit 1606, such as a keyboard, mouse, etc.; an output unit 1607, e.g., various types of displays and speakers; the storage unit 1608, e.g., a magnetic disk and an optical disc; and a communication unit 1609, e.g., a network card, a modem, and a wireless communication transceiver. The communication unit 1609 allows the device 1600 to exchange information/data with other devices over a computer network such as the Internet and/or various telecommunication networks.

The CPU 1601 may execute the methods and/or processing as described above, e.g., the method 200. For example, in some embodiments, the method 200 may be implemented as a computer software program that is tangibly included in a machine-readable medium, e.g., the storage unit 1608. In some embodiments, part or all of the computer program may be loaded and/or installed onto the device 1600 via the ROM 1602 and/or the communication unit 1609. When the computer program is loaded to the RAM 1603 and executed by the CPU 1601, one or more steps of the method 200 as described above may be performed. Alternatively, in other embodiments, the CPU 1601 may be configured to perform the method 200 in any other appropriate manner (e.g., by means of firmware).

The functions described herein above may be performed, at least in part, by one or a plurality of hardware logic components. For example, non-restrictively, illustrative types of hardware logic components that can be used include Field Programmable Gate Arrays (FPGAs), Application Specific Integrated Circuits (ASICs), Application Specific Standard Parts (ASSPs), Systems On Chip (SOC), Complex Programmable Logic Devices (CPLDs), etc.

In some embodiments, the methods and processes described above may be implemented as a computer program product. The computer program product may include a computer-readable storage medium on which computer-readable program instructions for performing various aspects of the present disclosure are loaded.

Program code for implementing the method of the present disclosure may be written by using one programming language or any combination of a plurality of programming languages. The program code may be provided to a processor or controller of a general purpose computer, a special purpose computer, or another programmable data processing apparatus, such that the program code, when executed by the processor or controller, implements the functions/operations specified in the flow charts and/or block diagrams. The program code may be executed completely on a machine, executed partially on a machine, executed partially on a machine and partially on a remote machine as a stand-alone software package, or executed completely on a remote machine or server.

The computer-readable program instructions described herein may be downloaded from a computer-readable storage medium to various computing/processing devices, or downloaded to an external computer or external storage device via a network, such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from a network and forwards the computer-readable program instructions for storage in a computer-readable storage medium in each computing/processing device.

The computer program instructions for performing the operations of the present disclosure may be assembly instructions, Instruction Set Architecture (ISA) instructions, machine instructions, machine-related instructions, microcode, firmware instructions, status setting data, or source code or object code written in one or any combination of more programming languages, including object-oriented programming languages and conventional procedural programming languages. The computer-readable program instructions may be executed entirely on a user computer, partly on a user computer, as a stand-alone software package, partly on a user computer and partly on a remote computer, or entirely on a remote computer or a server.

These computer-readable program instructions may be provided to a processing unit of a general-purpose computer, a special-purpose computer, or a further programmable data processing apparatus, thereby producing a machine, such that these instructions, when executed by the processing unit of the computer or the further programmable data processing apparatus, produce means for implementing functions/actions specified in one or more blocks in the flow charts and/or block diagrams. These computer-readable program instructions may also be stored in a computer-readable storage medium, and these instructions cause a computer, a programmable data processing apparatus, and/or other devices to operate in a specific manner; and thus the computer-readable medium having instructions stored includes an article of manufacture that includes instructions that implement various aspects of the functions/actions specified in one or more blocks in the flow charts and/or block diagrams. The computer-readable program instructions may also be loaded to a computer, other programmable data processing apparatuses, or other devices, so that a series of operating steps may be executed on the computer, the other programmable data processing apparatuses, or the other devices to produce a computer-implemented process, such that the instructions executed on the computer, the other programmable data processing apparatuses, or the other devices may implement the functions/actions specified in one or more blocks in the flow charts and/or block diagrams.

In the context of the present disclosure, a machine-readable medium may be a tangible medium that may include or store a program for use by an instruction execution system, apparatus, or device or in connection with the instruction execution system, apparatus, or device. The machine-readable medium may be a machine-readable signal medium or a machine-readable storage medium. The machine-readable medium may include, but is not limited to, an electronic, magnetic, optical, electromagnetic, infrared, or semiconductor system, apparatus, or device, or any suitable combination of the above content. More specific examples of the machine-readable storage medium may include one or more wire-based electrical connections, a portable computer diskette, a hard disk, a RAM, a ROM, an erasable programmable read-only memory (EPROM or flash memory), an optical fiber, a portable compact disk read-only memory (CD-ROM), an optical storage device, a magnetic storage device, or any suitable combinations thereof.

The flow charts and block diagrams in the drawings illustrate the architectures, functions, and operations of possible implementations of the devices, methods, and computer program products according to various embodiments of the present disclosure. In this regard, each block in the flow charts or block diagrams may represent a module, a program segment, or part of an instruction, and the module, program segment, or part of an instruction includes one or more executable instructions for implementing specified logical functions. In some alternative implementations, functions marked in the blocks may also occur in an order different from that marked in the accompanying drawings. For example, two successive blocks may in fact be executed substantially concurrently, and sometimes they may also be executed in a reverse order, depending on the functions involved. It should be further noted that each block in the block diagrams and/or flow charts as well as a combination of blocks in the block diagrams and/or flow charts may be implemented using a special-purpose hardware-based system that executes specified functions or actions, or using a combination of special-purpose hardware and computer instructions.

Additionally, although operations are depicted in a particular order, this should not be construed as a requirement that such operations be performed in the particular order shown or in a sequential order, or that all illustrated operations should be performed to achieve desirable results. Under certain environments, multitasking and parallel processing may be advantageous. Likewise, although the above discussion contains several specific implementation details, these should not be construed as limitations to the scope of the present disclosure. Certain features that are described in the context of separate embodiments may also be implemented in combination in a single implementation. Conversely, various features that are described in the context of a single implementation may also be implemented in a plurality of implementations separately or in any suitable sub-combination.

Although the present subject matter has been described using a language specific to structural features and/or method logical actions, it should be understood that the subject matter defined in the appended claims is not necessarily limited to the particular features or actions described above. Rather, the specific features and actions described above are merely example forms of implementing the claims.

Various embodiments of the present disclosure have been described above. The foregoing description is illustrative rather than exhaustive, and is not limited to the embodiments disclosed. Numerous modifications and alterations will be apparent to persons of ordinary skill in the art without departing from the scope and spirit of the illustrated embodiments. The selection of terms as used herein is intended to best explain the principles and practical applications of the various embodiments and their associated technical improvements, so as to enable persons of ordinary skill in the art to understand the various embodiments disclosed herein.

What is claimed is:

1. A method for road monitoring, comprising:
receiving, from a first node, by a second node, a target image from the first node, wherein the target image is determined as being of a first category based on performing target detection on a road monitoring image obtained by the first node, and the second node is closer to a cloud end than the first node;
determining, at the second node, a second category of the target image, wherein the second category is a subcategory of the first category; and
in response to the second category being a preset category, sending a warning corresponding to the second category to a terminal device associated with the road monitoring image;
wherein determining, at the second node, the second category of the target image comprises:
extracting a target feature of the target image;
determining similarities between the target feature and preset features in a first feature library; and
determining the second category of the target image according to the similarities and categories associated with the preset features;
wherein determining the second category of the target image comprises:
choosing a first group of preset features meeting a preset condition according to values of the similarities; and
determining the second category based on categories associated with respective preset features in the first group of preset features.

2. The method according to claim 1, wherein the target image is a cropped part of an image area containing an object of the first category in the road monitoring image based on the first node.

3. The method according to claim 1, wherein determining the second category of the target image further comprises:
determining, according to a category associated with each preset feature in the first group of preset features, a proportion of each category in all categories associated with the first group of preset features; and
determining a category with the greatest proportion as the second category of the target image.

4. The method according to claim 1, further including:
in response to determining that each of the similarities is less than a preset similarity threshold, sending the target image to the cloud end;
receiving, at the second node, the second category of the target image from the cloud end, wherein the second category is determined by the cloud end according to a target feature in the target image, preset features in a second feature library, and categories associated with the preset features in the second feature library, and the first feature library is a subset of the second feature library.

5. The method according to claim 4, wherein the target feature of the target image is obtained by a fine-tuned classification model at the cloud end, and the fine-tuned classification model performs fine-tuning on a trained classification model at the cloud end based on a newly added monitoring image and a newly added category corresponding to the newly added monitoring image.

6. The method according to claim 5, wherein the second feature library is obtained at the cloud end by acquiring a newly added preset feature corresponding to the newly added category using the fine-tuned classification model based on the newly added monitoring image and adding the newly added preset feature and the newly added category to the second feature library in the cloud end.

7. The method according to claim 5, further comprising:
receiving, at the second node, the fine-tuned classification model from the cloud end to update a trained classification model at the second node.

8. The method according to claim 1, wherein extracting the target feature of the target image comprises:
fine-tuning a trained classification model at the second node according to source monitoring images of the preset features in the first feature library of the second node and categories associated with the preset features to obtain a fine-tuned classification model, wherein the source monitoring images are images associated with a geographical area corresponding to the second node; and
acquiring a target feature in the target image using the fine-tuned classification model based on the target image.

9. The method according to claim 1, wherein the first node is a roadside edge node.

10. An electronic device, comprising:
at least one processor; and
memory coupled to the at least one processor and having instructions stored therein, wherein the instructions, when executed by the at least one processor, cause the electronic device to perform operations comprising:
receiving, from a first node, by a second node, a target image from the first node, wherein the target image is determined as being of a first category based on performing target detection on a road monitoring image obtained by the first node, the second node is closer to a cloud end than the first node, and the first node is a roadside edge node;
determining, at the second node, a second category of the target image, wherein the second category is a subcategory of the first category; and
in response to the second category being a preset category, sending a warning corresponding to the second category to a terminal device associated with the road monitoring image;
wherein determining, at the second node, the second category of the target image comprises:
extracting a target feature of the target image;
determining similarities between the target feature and preset features in a first feature library; and
determining the second category of the target image according to the similarities and categories associated with the preset features;
wherein determining the second category of the target image comprises:
choosing a first group of preset features meeting a preset condition according to values of the similarities; and
determining the second category based on categories associated with respective preset features in the first group of preset features.

11. The electronic device according to claim 10, wherein the target image is a cropped part of an image area containing an object of the first category in the road monitoring image based on the first node.

12. The electronic device according to claim 10, wherein determining the second category of the target image further comprises:
determining, according to a category associated with each preset feature in the first group of preset features, a proportion of each category in all categories associated with the first group of preset features; and
determining a category with the greatest proportion as the second category of the target image.

13. The electronic device according to claim 10, wherein the operations further comprise:
in response to determining that each of the similarities is less than a preset similarity threshold, sending the target image to the cloud end;
receiving, at the second node, the second category of the target image from the cloud end, wherein the second category is determined by the cloud end according to a target feature in the target image, preset features in a second feature library, and categories associated with the preset features in the second feature library, and the first feature library is a subset of the second feature library.

14. The electronic device according to claim 13, wherein the target feature of the target image is obtained by a fine-tuned classification model at the cloud end, and the fine-tuned classification model performs fine-tuning on a trained classification model at the cloud end based on a newly added monitoring image and a newly added category corresponding to the newly added monitoring image.

15. The electronic device according to claim 14, wherein the second feature library is obtained at the cloud end by acquiring a newly added preset feature corresponding to the newly added category using the fine-tuned classification model based on the newly added monitoring image and adding the newly added preset feature and the newly added category to the second feature library in the cloud end.

16. The electronic device according to claim 14, wherein the operations further comprise:
receiving, at the second node, the fine-tuned classification model from the cloud end to update a trained classification model at the second node.

17. The electronic device according to claim 10, wherein extracting the target feature of the target image comprises:
fine-tuning a trained classification model at the second node according to source monitoring images of the preset features in the first feature library of the second node and categories associated with the preset features to obtain a fine-tuned classification model, wherein the source monitoring images are images associated with a geographical area corresponding to the second node; and
acquiring a target feature in the target image using the fine-tuned classification model based on the target image.

18. A computer program product that is tangibly stored on a non-transitory computer-readable medium and comprises machine-executable instructions, wherein the machine-executable instructions, when executed by a machine, cause the machine to perform operations comprising:
receiving, from a first node, by a second node, a target image from the first node, wherein the target image is determined as being of a first category based on performing target detection on a road monitoring image obtained by the first node, and the second node is closer to a cloud end than the first node;
determining, at the second node, a second category of the target image, wherein the second category is a subcategory of the first category; and
in response to the second category being a preset category, sending a warning corresponding to the second category to a terminal device associated with the road monitoring image;

wherein determining, at the second node, the second category of the target image comprises:
extracting a target feature of the target image;
determining similarities between the target feature and preset features in a first feature library; and
determining the second category of the target image according to the similarities and categories associated with the preset features;
wherein determining the second category of the target image comprises:
choosing a first group of preset features meeting a preset condition according to values of the similarities; and
determining the second category based on categories associated with respective preset features in the first group of preset features.

19. The computer program product according to claim 18, wherein determining the second category of the target image further comprises:
determining, according to a category associated with each preset feature in the first group of preset features, a proportion of each category in all categories associated with the first group of preset features; and
determining a category with the greatest proportion as the second category of the target image.

20. The computer program product according to claim 18, wherein the operations further comprise:
in response to determining that each of the similarities is less than a preset similarity threshold, sending the target image to the cloud end;
receiving, at the second node, the second category of the target image from the cloud end, wherein the second category is determined by the cloud end according to a target feature in the target image, preset features in a second feature library, and categories associated with the preset features in the second feature library, and the first feature library is a subset of the second feature library.

* * * * *